UNITED STATES PATENT OFFICE.

DANIEL DRAWBAUGH, OF EBERLYS MILL, AND BLAKE E. GAMBLE, OF BOWMANSDALE, PENNSYLVANIA; SAID DRAWBAUGH ASSIGNOR TO THE DRAWBAUGH ARTIFICIAL FUEL COMPANY, OF HARRISBURG, PENNSYLVANIA, A CORPORATION OF PENNSYLVANIA.

ARTIFICIAL FUEL AND METHOD OF MAKING THE SAME.

No. 867,915.    Specification of Letters Patent.    Patented Oct. 8, 1907.

Application filed June 18, 1906. Serial No. 322,310.

*To all whom it may concern:*

Be it known that we, DANIEL DRAWBAUGH, of Eberlys Mill, Cumberland county, Pennsylvania, and BLAKE E. GAMBLE, of Bowmansdale, Cumberland county, Pennsylvania, both citizens of the United States, have invented certain new and useful Improvements in Artificial Fuel and Methods of Making the Same, of which the following is a full, clear, and exact description.

This invention relates to an artificial fuel, and a method of making or cohesing the same, without the aid of heat; and in order to produce this fuel, we employ comminuted carbonaceous material, such as fine coal or slack, peat, sawdust, tanbark, or other comminuted wood fiber; a binder, such as dehydrated sulfate of lime, (anhydrous gypsum, or plaster of paris), and an oxidizer, such as manganese oxid, or dioxid, these being thoroughly mixed before adding sufficient water to insure cohesion. To resist water and weather, we employ a solution of potash water glass, which is sprayed upon the fuel after briqueting.

The solution of potash water glass, is preferably boiled with water before spraying, the boiling action producing a syrup of such a consistency as to render the water glass applicable to the briquets in a thin coat, which though uninflammable, allows access to the particles of the fuel, when melted, by the fire.

Any desired proportion may be used, but the preferable formula is as follows:—comminuted carbonaceous material, about 91 1/2%; plaster of paris, about 7 3/4%; manganese oxid, about 3/4%, and solution of potash water glass, sufficient to insure water-proofing and weather resisting.

To properly produce our improved fuel, the peat is first dried, cured and comminuted. This is then mixed with the fine coal and wood fiber, and the manganese oxid is added, the whole being mixed, preferably in a continuous mixer until it becomes a homogeneous mass. After thoroughly mixing, the dehydrated sulfate of lime is added, and the mass moistened sufficiently to insure cohesion. The moistened and mixed mass is then pressed into blocks or briquets and dried for a day or two; and finally sprayed with a solution of potash water glass.

The potash water glass is used, preferably in this case, as although it is non-combustible, it fuses at a great heat, and this assists in holding the particles of the fuel together a longer period than materials that melt at a low temperature. The quantity employed is so small, that the combustibility of the fuel is not impaired to an appreciable degree.

We claim:—

1. The herein described method of producing an artificial fuel, consisting of mixing the ingredients, compressing the same in briquets, and then spraying the briquets with a solution of water glass to coat the briquet to resist water and weather.

2. The herein described method of producing an artificial fuel, consisting in mixing together comminuted carbonaceous material adding thereto and mixing therewith manganese oxid; adding thereto and thoroughly mixing therewith a cementing compound; moistening the mixed mass to insure coalescence of the particles; pressing and molding the moistened and mixed mass into blocks or briquet; drying the product; and spraying the product with water glass to make the product water-proof and weather resistant.

3. An artificial fuel, composed of comminuted carbonaceous material, a cement and water, and manganese oxid; and a coating of water glass for the briquet, formed of the above material to form a water-proofing and weather-resisting coating for the briquets.

4. An artificial fuel, composed of thoroughly commingled comminuted carbonaceous material, dehydrated sulfate of lime, manganese oxid, and water; and a coating of water glass for the briquets formed of the above material to form a water-proofing and weather-resisting coating for the briquets.

5. An artificial fuel, composed of comminuted carbonaceous material, a cement and water, and manganese oxid; and a coating of potash water glass for the briquet, formed of the above material to form a water-proofing and weather-resisting coating for the briquets.

6. An artificial fuel, composed of thoroughly commingled comminuted carbonaceous material, dehydrated sulfate of lime, manganese oxid, and water; and a coating of potash water glass for the briquets formed of the above material to form a water-proofing and weather-resisting coating for the briquets.

7. An artificial fuel, the ingredients of which are cemented by a quick-setting cement and pressure; and a coating of water glass for the compressed and completed briquets so as to coat the same to resist water and weather.

8. An artificial fuel, the ingredients of which are cemented by a quick-setting cement and pressure; and a coating of potash water glass for the compressed and completed briquets so as to coat the same to resist water and weather.

DANIEL DRAWBAUGH.
BLAKE E. GAMBLE.

Witnesses:
A. M. BOWMAN,
H. N. BOWMAN.